United States Patent Office 3,062,708
Patented Nov. 6, 1962

3,062,708
AROMATIC BORANE THALLOPHYTICIDES
David M. Updegraff, North Oaks, Minn., assignor to Minnesota Mining and Manufacturing Company, St. Paul, Minn., a corporation of Delaware
No Drawing. Filed Jan. 4, 1960, Ser. No. 71
30 Claims. (Cl. 167—30)

This invention relates to a process for inhibiting the growth of microorganisms and more particularly for preventing or terminating the growth of organisms of the division Thallophyta, and to compositions effective for this purpose.

Processes for killing or inhibiting the growth of microorganisms such as the lower non-vascular plants are of great utility in virtually all phases of argriculture, industry and household activities since the effects of such microorganisms include such diverse results as diseases of plants, deterioration of materials and spoilage of goods. Furthermore, since these lower forms of life are readily distributed from place to place, as for example, by air dispersal, being in the form of individual cells which may be thought of as spores, contamination of a given material by numerous species is a common result. This means that to achieve protection of material such as paper, plastic or cloth against one species or even one family of such organisms may disturb a possible natural balance of species, an antagonism such as has been amply shown, for example, between the mold Penicillium and many bacteria. Disturbance of this balance, while protecting against one species, may leave the way open for rapid multiplication and attack by another species. It is accordingly apparent that what is needed for many applications is a broad spectrum of activity against a number of types of microorganisms.

It is an object of this invention to provide broad-spectrum bactericides. A further object is to provide a process for the inhibition and/or termination of growth of certain microorganisms. A still further object is to provide compositions for accomplishing these objectives. Other objects will become evident from the disclosure hereinafter.

While the classification of plants has proceeded over at least two centuries, it must be recognized that there is still a dispute with respect to the classification of some microorganisms and accordingly it will be noted that the terms herein used are to be understood in light of the present disclosure, as these generally will be correctly understood even though they may be somewhat more embracing in scope than when employed by some taxonomists.

In accordance with the above and other objects of this invention it has been found that the life cycles of numerous microoorangisms are impaired and terminated by application thereto of low concentrations of the class of compounds best described as triarylboranes. Broadly speaking, these compounds have been known to the art for many years, yet their surprisingly high activity against microorganisms apparently has been unknown heretofore.

As will become evident from reading the present specification, the spectrum of activity of these compounds is very broad, and organisms susceptible to them include members of several well-recognized divisions of the plant kingdom as well as some organisms which are sometimes but not universally considered to be very low members of the animal kingdom. Because the majority of these organisms are recognized as belonging in the well-recognized division Thallophyta, and the others might be so classified, this term is here employed to include all microorganisms subject to the process of this invention, which accordingly may be termed thallophytes. Thallophytes are usually haploid organisms reproducing asexually or vegetatively, although it will be understood that many of these organisms are also capable of sexual reproduction.

In order to clarify this definition still further, the major classes and orders of organisms falling under this division are tabulated:

Schizomycetes, e.g.:
    Bacillus subtilis
    Xanthomonas phaseoli
    Micrococcus pyogenes var. aureus
    Mycobacterium phlei
    Pseudomonas aeruginosa
    Serratia marcescens
    Escherichia coli (Gratia strain)
    Escherichia coli (Crookes strain)
    Micrococcus lysodeikticus
    Areobacter aerogenes
    Neisseria catarrhalis
    Proteus morganii
    Alkaligenes viscosus
    Micrococcus pyogenes var. aureus
      (penicillin-resistant strain)
    Desulfovibrio aestuarii
Myxomycetes, e.g.:
    Plasmodiophora brassicae
Phycomycetes, e.g.:
    Rhizopus nigricans
    Phytophthora infestans
    Aphanomyces eulichthes
    Erysiphe polygoni
    Pythium ultimum
Ascomycetes, e.g.:
    Monilia fructicola
    Aspergillus niger
    Glomerella cingulata
    Graphium ulmi
    Torula
    Saccharomyces
    Candida albicans
    Aspergillus sp.
Basidiomycetes, e.g.:
    Uromyces phaseoli
Fungi Imperfecti, e.g.:
    Alternaria oleracea
    Alternaria solani
    Stemphylium sp.
    Trichophyton mentagrophytes
    Microsporum gypseum
    Microsporum audouini
    Fusarium oxysporum
    Epidermophyton floccosum
    Helminthosporium sativum
    Rhizoctonia solani
    Pullularia pullulans
Algae, e.g.:
    Euglena gracilis
    Chlamyldomonas eugametos It may be noted that the Fungi Imperfecti are organisms sexual reproduction of which has not been observed and which may well prove to be Ascomycetes.

It is found that the process of this invention is especially valuable as applied to certain fungi which are known to be phytopathogenic for higher vascular plants of agricultural and economic importance such as peas, beans, tomatoes, cotton, trees including fruit trees, grains and the like. Products in which the triaryl boranes are incorporated in or over plastics, fibrous materials such as cloth and paper and leather to protect them against attack by microorganisms are also particularly valuable embodiments of the process of this invention. The prevention of the growth of thallophytes in water used in certain industrial applications, such as in cooling towers and in the flooding of oil fields for the secondary recovery of oil, is also an important utility.

The triaryl boranes, which may be employed as such, or used in the form of useful complexes for the process of the invention are exemplified by compounds such as triphenyl borane, tri-p-xylylborane, tri-p-tolyl borane, triphenetyl borane, tri-(p-fluorophenyl)borane, tri-(p-methoxyphenyl)borane, tri-α-naphthyl borane and the like. Triphenyl borane is preferred in the formation of these complexes because it is readily prepared from the easily accessible starting compounds chlorobenzene or bromobenzene and is highly effective in the process of the invention. A convenient method for the preparation of triphenyl borane is the reaction of a metallic derivative of bromobenzene such as phenyl magnesium bromide with boron trifluoride, as described in Berichte, vol. 55B, p. 1261 (1922).

The triaryl boranes are as a class more or less unstable in the presence of oxygen, i.e. they apparently combine with the oxygen to form the corresponding diaryl or monoaryl borinic or boronic acid which has negligible thallophyticidal activity compared to the triaryl borane itself. Further, triphenyl borane and substituted triphenyl boranes, such as tri(p-fluorophenyl)borane, tri(p-methoxyphenyl)borane and tri(p-tolyl)borane, which exhibit relatively higher thallophyticidal activity than do the other triaryl boranes, are also relatively unstable with respect to atmospheric oxygen. This group of compounds may be designated generically as the triphenylboranes.

The instability of triphenylboranes is advantageous in certain applications, e.g. in the killing of the thallophytes on the surface of laboratory glassware or other articles where it is desired that the surface will soon thereafter be free of the highly thallophyticidal compound. In many other applications, however, such as the treatment of useful higher plants in order to rid them of thallophyticidal pests, it may be necessary that the triphenyl borane entity be retained for a longer period of time. It has now been found that it is possible when desired to stabilize the highly active but unstable triphenyl boranes while maintaining their high degree of thallophyticidal activity. This is accomplished by forming complexes between the triphenyl boranes and the class of compounds which can be described as Lewis bases having $pK_b$ values not greater than about 10. The complexes thus formed are ordinarily almost indefinitely stable and have the additional advantage of providing a large number of molecules carrying a triphenyl borane entity having among them a wide spectrum of solubilities in various solvents and combinations of solvents. It will be recognized readily by those skilled in the art that this degree of control over solubility characteristics vastly increases the utility of these compounds as thallophyticides, since solubility is a major consideration in effectiveness against particular organisms as well as in methods of use and concentrations of the compositions used.

The triaryl boranes other than the triphenylboranes are generally comparatively more stable to atmospheric oxygen, and in fact the trinaphthyl boranes are sufficiently stable so that additional stabilization through the formation of complexes is not specially advantageous with respect to many agricultural and industrial thallophyticidal uses. The greatly broader utility of the complexes as compared to the uncomplexed materials brought about by making it possible to place the various triaryl borane entities in complexes of varying solubility characteristics holds however for the entire class of triaryl boranes, including the trinaphthyl boranes. For these reasons, the complexes of the triaryl boranes with Lewis bases having $pK_b$ values less than about 10 form a preferred class of thallophyticides of the invention. Further, for reasons also already given, the complexes of the triphenylboranes with Lewis bases having $pK_b$ values not greater than about 10 are a particularly preferred group. (The term $pK_b$ is used herein in its conventional meaning, i.e. the negative logarithm of the ionization constant $K_b$).

Lewis bases having $pK_b$ values greater than about 10 do not appear to form complexes with the triaryl boranes which affect their stability or thallophyticidal activity. Although the reasons for this are not known, it may be that if complexes are formed, they are unstable under the conditions encountered in testing or use.

Suitable Lewis base complexing agents are, for example, ammonia, methylamine, dodecylamine, n-tetradecyl amine, ethylenediamine, hexamethylene diamine, tetrahydrofurfuryl aminoethanol, acetylacetone imide, benzylamine, triethylenetetramine, N-alkyl propylene, diamines such as 12-(N-dodecyl propylamine, dimethylamine, di-n-propylamine, N-methylethanol amine, piperidine, piperazine, morpholine, trimethylamine, tri-n-propylamine, 3-dimethylamino-propylamine, tributylphosphine, phenyldiethylphosphine, phenyl-dipropylphosphine, pyridine, 3-bromopyridine, γ-ethylpyridine, 3-(4-pyridyl)-propanol-1, 3,5-dichloro-pyridine, bis(4-pyridyl)glycol, nicotine, isonicotinic acid, n-butyl nicotinate, nicotinamide, isonicotinic thionamide, β-picoline, γ-picoline, imidazole, metallic bases including alkali and alkaline earth metal hydroxides, such as sodium hydroxide, calcium hydroxide, potassium hydroxide, and the like.

Another form of a complex which is useful in the invention is that which can be formed by the triaryl boranes with solvents, such as benzene, ethylbenzene, etc. In this case the composition is possibly a solvate or the like, and the activity displayed as a thallophyticide is that of the triaryl borane. Complexes of this type with other organic solvents such as ether, are somewhat more stable than those made with benzene, but they are likewise not stable in aqueous solutions under the conditions described herein.

Broadly speaking, the process for the preparation of these complexes comprises preparing an ether solution of the triaryl borane and introducing the desired Lewis base. The complexes appear to form in mol-for-mol proportions, and ordinarily, there is immediate precipitation of the ether-insoluble complex. The operation is carried out in the absence of air. Specific directions for the preparation of the complexes of triphenyl borane are set forth in Berichte, vol. 57B, p. 813; ff., 1924, while other triaryl boranes and their complexes are described in the same Journal, vol. 61B, p. 271, 1928; vol. 63B, p. 934, ff., 1930; and vol. 64B, p. 2112, 1931; and in Annalen, vol. 573, p. 195, 1951.

The following descriptions, including uncorrected melting points where available, of a number of these complexes will serve to characterize them and are generally illustrative of the complexes of the invention.

| | M.P. or appearance |
|---|---|
| Triphenylborane-ammonia | 179–183° C. |
| Triphenylborane-methyl amine | 195–213° C. |
| Triphenylborane-dodecyl amine | Tan grease. |
| Triphenylborane-n-tetradecyl amine | Tan oil. |
| Triphenylborane-triethylene-tetramine | 75–84° C. |
| Triphenylborane-duomeen S | Red, viscous oil. |
| Triphenylborane-duomeen 12 | Red, viscous oil. |
| Triphenylborane-duomeen C | Red, viscous oil. |
| Triphenylborane-dimethylamine | 157–166° C. |
| Triphenylborane-piperidine | Ivory wax. |
| Triphenylborane-piperazine | 170–175° C. |
| Triphenylborane-trimethylamine | 132–138° C. |
| Triphenylborane-pyridine | 182–202° C. |
| Triphenylborane-3,5-dichloro-pyridine | 112–115° C. |
| Triphenylborane-bis-(4-pyridyl)glycol | 173–181° C. |
| Triphenylborane-γ-picoline | 135–145° C. |
| Triphenylborane-imidazole | 185–190° C. |

| | M.P. or appearance |
|---|---|
| Triphenylborane-sodium hydroxide | White solid, does not melt below 300° C. |
| Tri(α-naphthyl)borane-ammonia | 153–157° C. |
| Tri(α-naphthyl)borane-diethylamine | 170–175° C. |
| Tri(α-naphthyl)borane-trimethylamine | 156–158° C. |
| Tri(p-fluorophenyl)borane-ammonia | 179–181° C. |
| Tri(p-fluorophenyl)borane-triethylamine | 110–115° C. |
| Tri(p-methoxyphenyl)borane-ammonia | 138–142° C. |
| Tri(p-tolyl)borane-ammonia | 143–156° C. |

As the effective portion of the complex for the purposes of the invention is the triaryl borane moiety of the compounds, the gist of the process is to bring the triarylborane into contact with the organisms to be inhibited in an effective amount. This can be accomplished by a variety of means. Since the compounds are very strongly active, they are effective in very small amounts, and therefore are applied in diluted form. This particularly is necessary when the compositions are to be applied to plants or useful higher organisms, since the use of concentrated dispersions or undiluted triarylboranes causes toxic effects. Thus, phytotoxicity evidenced e.g. by browning of foliage, dwarfing, reduction in germination of seeds and the like, may be encountered. These untoward effects can be eliminated or reduced by employing the compositions of the invention for these purposes. Thallophyticidal compositions of the invention consist essentially of an effective amount of triaryl borane complex at a concentration of at least about 0.1 part per million, ranging upward to about 1 percent, in a compatible inert diluent. As extending or diluting means any inert diluent can be used, which does not adversely affect the substrate to which the triaryl borane is to be applied, i.e. is substantially non-toxic. Water, aqueous solvents, inert powders such as finely divided chalk, diatomaceous earth and the like, oil-water emulsions and the like, etc., can be thus employed. Thus, for example, the triarylborane complexes can often be prepared in finely divided form and thoroughly mixed with an inert dust or fine powder such as diatomaceous earth in concentration of 100 parts per million of the selected complex. The resulting powder may be dusted upon the leaves of plants to be treated, using a dusting gun of conventional type. Adjuvants such as wetting agents, buffers, thickening agents and the like can also be incorporated into the extending media, in the same way as is known for other products of the type herein disclosed. The dilute mixtures are readily applied by any convenient means, as, for example, dusting, spraying, drenching and so on, according to the extending medium used and the objects to be treated. Furthermore, as an agronomical practice, the triarylborane-containing compound can be incorporated into the soil in concentration ranging upwards from about 10 p.p.m. Application in amount of about 10 to 100 lbs./acre is a preferred range for use for this purpose.

Where growing plants are to be treated, low concentrations of the triaryl boranes are preferably employed, such as concentrations of the order of one to 100 parts of the complex per million parts of extending medium. Higher concentrations of the triaryl boranes, e.g. in certain cases of the order of 500 parts of the complex per million parts of extending medium, begin to exhibit herbicidal characteristics toward higher growing plants. Thus, although this maximum will vary, it appears that the effective application to growing plants of the triarylborane complexes for the purpose of inhibiting the growth of thallophytes should be held within a definite range of concentrations below about 1000 p.p.m., depending upon the particular situation and the particular plants involved. Ordinarily the ratio of concentrations at which serious herbicidal activity is noted to the concentrations at which useful thallophyticidal activity is realized is of the order of 5:1 or greater.

For application to such things as plastics, fibrous materials, leather, textiles, wood, paper and the like, more concentrated preparations containing on the order of 0.01 percent by weight to 1 percent by weight or more of the triarylborane can be used. Since certain of the triarylborane complexes are of very low solubility in water, solvents such as pyridine, morpholine, dioxane and tetrahydrofuran must be used if solutions of high percentage composition are desired. These may be diluted with water for use. Obviously, suspensions, or dilutions using solid extending media, are not subject to solubility limitations. Where organic solvents are not injurious or toxic for the particular application, organic solvent solutions or suspensions of the compounds useful in the process of the invention can be employed.

This application is a continuation-in-part of my prior co-pending application Serial Number 783,167, filed December 29, 1958, now abandoned.

The following examples illustrate methods and compositions used in practicing this invention, but are not to be construed as limiting the scope thereof in respect of the compositions or complexes to be employed or the organisms to be subjected to the process of this invention. Likewise, the particular methods described for application of the compositions to the substrates which are to be treated to inhibit the growth of thallophytes thereon are merely exemplary, and it will be apparent to those skilled in the art that other methods can be employed. Such methods are well known to the art and require no further amplification herein. The abbreviation p.p.m. in the examples indicates concentration in parts per million (on a weight/volume, e.g. milligrams per liter basis).

The following details pertain to Examples 1–10.

A. The code used to designate the organisms is as follows:

Alg. 1.—*Euglena gracilis*
Alg. 2.—*Chlamydomonas eugametos* (male)
Fun. 3.—*Aspergillus niger*
Bac. 4.—*Micrococcus pyogenes* var. *aureus* (penicillin-resistant strain)
Fun. 5.—*Candida albicans*
Fun. 6.—*Aspergillus sp.*
Bac. 7.—*Micrococcus pyogenes* (var. *aureus*)
Bac. 8.—*Bacillus subtilis*
Bac. 9.—*Mycobacterium phlei*
Bac. 10.—*Pseudomonas aeruginosa*
Bac. 11.—*Serratia marcescens*
Bac. 12.—*Escherichia coli* (Gratia strain)
Bac. 13.—*Escherichia coli* (Crookes strain)
Bac. 14.—*Micrococcus lysodeikticus*
Bac. 15.—*Aerobacter aerogenes*
Bac. 16.—*Neisseria catarrhalis*
Bac. 17.—*Proteus morganii*
Bac. 18.—*Alkaligenes viscosus*
Bac. 19.—*Desulfovibrio aestuarii*

B. The methods of evaluation are as follows:

All bacteria except Bac. 19 are grown on APT agar slants at 37° C. for 24 to 48 hours. From 2 to 4 loopfuls of growth are carefully removed from the surface of the agar and dispersed in 3 ml. of sterile Davis mineral-salts basal medium (J. Bact., vol. 66, pp. 129–136, 1953). One loopful of the bacterial dispersion is used to inoculate the test plate. APT agar (Case Laboratories, Chicago), contains the following ingredients:

| | Grams |
|---|---|
| Agar | 15.0 |
| Tryptone | 12.5 |
| Yeast extract | 7.5 |
| Dextrose | 10.0 |
| Sodium citrate | 5.0 |
| Polyoxyethylene Sorbitan monooleate | 0.2 |
| NaCl | 5.0 |
| $Na_2CO_3$ | 1.25 |
| $MgSO_4 \cdot 7H_2O$ | 0.80 |
| $MnCl_2 \cdot 4H_2O$ | 0.14 |
| $FeSO_4 \cdot 7H_2O$ | 0.04 |
| $KH_2PO_4$ | 5.0 |

Water, q.s. to make 1 liter.

All fungi are grown on Mycophil agar (Baltimore Biological Laboratories) at 20–25° C. for 3 to 6 days. Mycophil agar contains:

| | Grams |
|---|---|
| Agar | 16 |
| Phytone | 10 |
| Dextrose | 10 |

Water, q.s. to make 1 liter.

A 3 ml. portion of sterile Davis mineral-salts basal medium is then poured into the culture tube, and the tube is agitated to obtain a heavy spore suspension. One loopful of the spore suspension is used to inoculate an agar plate used for determination of inhibitory activity.

In carrying out the determination of inhibitory power, the selected triarylborane or complex is added to a 10 ml. portion of the sterile liquefied agar medium (described in detail below) at concentrations of 1, 10, and 100 mg./l. Each portion is poured into a sterile Petri dish 9 cm. in diameter, and allowed to solidify. The various previously prepared inocula of bacteria and fungi are streaked radially on the surface of the plate (in a radial manner, so that none of the inoculated portions of agar touch at any point). The plates are incubated at 30° C. for at least 3 days, and examined for evidence of growth. Control plates, containing no added chemical, are always run concurrently, and always show good growth of the organisms.

The agar plates are prepared from a synthetic medium made by adding certain amounts of agar and nutrients to Davis mineral-salts basal medium.

For the fungi, and those bacteria which will grow on a glucose-mineral salts agar, there are added 2.0 g. of glucose and 20 g. of purified agar per liter of culture medium.

For those bacteria which require vitamins or amino acids, the agar and glucose-containing Davis medium is used with the following supplements.

| Vitamin supplement: | Concentration in medium (mg./l.) |
|---|---|
| Niacin | 2.0 |
| Calcium pantothenate | 2.0 |
| Pyridoxine hydrochloride | 4.0 |
| Thiamine hydrochloride | 2.0 |
| Biotin | 0.0175 |
| Amino acid supplement: | |
| Glutamic acid | 600 |
| Cystine | 200 |
| Asparagine | 800 |
| Alanine | 400 |
| Disodium ethylene diamine tetraacetic acid | 20 |

Algae are grown upon soil extract medium. A 0.05 ml. aliquot (one drop) of the organisms in soil-extract medium is added to 1.0 ml. of a solution of the compound being tested in deionized water and examined after one hour and after about 1 day to determine whether motility has ceased. The results are shown as minimum concentration in parts per million to inhibit motility.

C. The $pK_b$ values reported are those of the compound which is complexed with the triarylborane.

D. The Thallophyticidal Index is included as a general approximation of the overall effectiveness of the compound in question against thallophytes.

The index is calculated from the data reported in these examples relative to the organisms Alg. 1, Alg. 2, Fun. 3 and Bac. 4. If an organism is inhibited by a one part per million (or more dilute) solution of the compound being tested, a value of 100 is assigned to it for the index. Similarly, if inhibition occurs at a concentration greater than one, but not greater than 10 parts per million, a value of 10 is assigned, and if inhibition occurs at a concentration greater than ten, but not greater than one hundred parts per million, a value of 1 is assigned. If inhibition occurs at a concentration of greater than 100 parts per million, a value of zero is assigned. The Thallophyticidal Index for any compound is the sum of the four values assigned relative to the indicated organisms.

The exact level of effectiveness of a particular compound with respect to any organism cannot be extrapolated with assurance to others although it is clear that the triarylborane-containing compounds are generally effective against the thallophytes as a class at relatively low concentrations. Thus, no single number designation can provide more than a measure of the probable effective level of a compound against the thallophytes. Experience indicates, however, that the Thallophyticidal Index furnished a surprisingly dependable (although quite conservative) number value for the utility of a test compound in this field. Thus, for example, any compound which scores 20 in this index is consistently found to be a valuable thallophyticide, while compounds having indexes of 200 (which are quite rare) are generally at least equal to the most powerful commercial thallophyticides. On the other hand, many valuable thallophyticides, including compositions sold commercially for this purpose, will have Thallophyticidal Indexes of zero. This is particularly true of those which are commonly applied in concentrations in excess of 100 p.p.m., and those which are used in applications in which the characteristic of remaining in place for long periods of time (commonly associated with a high degree of insolubility) is required.

*Example 1*

The inhibiting concentration of aqueous solutions of the complex of triphenylborane and ammonia against various representative organisms was determined with the following results:

| Complex of triphenylborane with— | Inhibitory dose to indicated organism (p.p.m.) | | | | |
|---|---|---|---|---|---|
| | Alg. 1 | Alg. 2 | Fun. 3 | Bac. 4 | Thallophyticidal index |
| Ammonia | 1 | 1 | 10 | 10 | 220 |

| Complex of triphenylborane with— | Inhibitory dose to indicated organism (p.p.m.) | | | | | | |
|---|---|---|---|---|---|---|---|
| | Fun. 5 | Fun. 6 | Bac. 7 | Bac. 8 | Bac. 10 | Bac. 11 | Bac. 12 | Bac. 14 |
| Ammonia | 100 | 100 | 100 | 100 | X | *X | 10 | 100 |

Note.—Ammonia has the $pK_b$ value 4.74, *X=>100.

*Example 2*

Complexes of triphenylborane with several primary ali-

| Complex of triphenylborane with the following— | Inhibitory dose to indicated organism (p.p.m.) | | | | | |
|---|---|---|---|---|---|---|
| | Bac. 13 | Bac. 14 | Bac. 15 | Bac. 16 | Bac. 17 | Bac. 18 |
| Tributylphosphine | 100 | | 100 | 100 | 100 | 100 |
| Phenyl-diethylphosphine | | 100 | | 100 | | |
| Phenyl-dipropylphosphine | | 100 | | 100 | | |

Example 6

The inhibitory dose of complex of triphenylborane with sodium hydroxide against various organisms was determined with the following results:

| Complex of triphenylborane with the following— | Inhibitory dose to indicated organism (p.p.m.) | | | | Thallophyticidal index |
|---|---|---|---|---|---|
| | Alg. 1 | Alg. 2 | Fun. 3 | Bac. 4 | |
| Sodium hydroxide | 1 | 1 | 100 | 1 | 301 |

| Complex of triphenylborane with the following— | Inhibitory dose to indicated organism (p.p.m.) | | | | | |
|---|---|---|---|---|---|---|
| | Fun. 5 | Fun. 6 | Bac. 8 | Bac. 12 | Bac. 14 | Bac. 16 |
| Sodium hydroxide | 100 | 100 | <1 | 100 | 10 | 10 |

NOTE.—Sodium hydroxide has the pK$_b$ value <1.

Example 7

Determination of the inhibiting concentration of complexes of triphenylborane with representative basic nitrogen-containing aromatic heterocyclic compounds against various organisms gives the following results:

| Complex of triphenylborane with the following— | pK$_b$ | Inhibitory dose to indicated organism (p.p.m.) | | | | Thallophyticidal index |
|---|---|---|---|---|---|---|
| | | Alg. 1 | Alg. 2 | Fun. 3 | Bac. 4 | |
| Pyridine | 8.64 | 1 | 1 | 10 | 10 | 220 |
| 3-bromopyridine | 7.82 | 1 | 1 | 100 | 10 | 211 |
| γ-Ethylpyridine | Ca. 8.6 | 1 | 1 | 100 | 10 | 211 |
| 3-(4-pyridyl)propanol-1 | <8.6 | 1 | 1 | 100 | 100 | 202 |
| 3,5-dichloro-pyridine | Ca. 9 | 1 | 1 | 100 | 100 | 202 |
| Bis(4-pyridyl)glycol | Ca. 8.6 | 1 | 1 | 100 | 100 | 202 |
| Nicotine | 6.05 | 1 | 1 | 100 | 10 | 211 |
| Isonicotinic acid | Ca. 10 | 1 | 1 | 100 | 100 | 202 |
| n-Butylnicotinate | Ca. 8.7 | 1 | 1 | 100 | 100 | 202 |
| Nicotinamide | 8.64 | 1 | 1 | 100 | 10 | 211 |
| Isonicotinic thionamide | Ca. 9 | 1 | 1 | 100 | 100 | 202 |
| β-Picoline | 7.96 | 1 | 1 | 100 | 100 | 202 |
| γ-Picoline | 7.96 | 1 | 1 | 100 | 100 | 202 |
| Imidazole | 4.37 | 10 | 1 | 100 | 100 | 112 |

| Complex of triphenylborane with the following— | Inhibitory dose to indicated organism (p.p.m.) | | | |
|---|---|---|---|---|
| | Fun. 5 | Bac. 11 | Bac. 12 | Bac. 16 |
| γ-Ethylpyridine | X | X | 10 | 100 |
| 3-(4-pyridyl)-propanol-1 | 100 | X | 100 | 100 |
| 3,5-dichloro-pyridine | 100 | 100 | 100 | 100 |
| Bis(4-pyridyl)glycol | 100 | 100 | 100 | 100 |
| Isonicotinic acid | 100 | 100 | 100 | 100 |
| n-Butylnicotinate | 100 | 100 | 100 | 100 |
| Isonicotinic thionamide | 100 | 100 | 100 | 100 |
| β-Picoline | 100 | X | 100 | 100 |
| γ-Picoline | 100 | 100 | 100 | 100 |
| Imidazole | 100 | 100 | 100 | 100 |

Four of the complexes from the preceding tables were further evaluated as thallophyticides as shown below:

| Complex of triphenylborane with the following— | Inhibitory dose to indicated organism (p.p.m.) | | | | | | | |
|---|---|---|---|---|---|---|---|---|
| | Fun. 5 | Fun. 6 | Bac. 7 | Bac. 8 | Bac. 9 | Bac. 10 | Bac. 11 | Bac. 12 |
| Pyridine | | 10 | 1 | 1 | 10 | 100 | | 10 |
| 3-bromopyridine | 100 | 100 | 10 | 10 | | X | 100 | 10 |
| Nicotine | 100 | 100 | <10 | <10 | <10 | X | 100 | 100 |
| Nicotinamide | 100 | 100 | 10 | 10 | | X | 100 | 10 |

| Complex of triphenylborane with the following— | Inhibitory dose to indciated organism (p.p.m.) | | | | |
|---|---|---|---|---|---|
| | Bac. 13 | Bac. 14 | Bac. 15 | Bac. 16 | Bac. 17 |
| Pyridine | | 1 | | | |
| 3-bromopyridine | 100 | | 100 | 100 | X |
| Nicotine | 100 | | 100 | 10 | 100 |
| Nicotinamide | 100 | | 100 | 10 | 100 |

Example 8

Determination of the inhibitory dose of representative complexes of trinaphthyl borane against various organisms yielded the following results:

| Complex of trinaphthylborane with the following— | pK$_b$ | Inhibitory dose to indicated organism (p.p.m.) | | | | Thallophyticidal index |
|---|---|---|---|---|---|---|
| | | Alg. 1 | Alg. 2 | Fun. 3 | Bac. 4 | |
| Ammonia | 4.74 | 10 | 10 | X | <10 | 30 |
| Diethylamine | 2.89 | 10 | 10 | X | | 20 |
| Trimethylamine | 4.13 | 10 | 10 | X | | 20 |
| Pyridine | 8.64 | 10 | 10 | X | <10 | 30 |
| Benzene [1] | | 10 | 10 | X | 100 | 21 |

| Complex of trinaphthyl borane with the following— | Inhibitory dose to indicated organism (p.p.m.) | | | | |
|---|---|---|---|---|---|
| | Fun. 5 | Bac. 7 | Bac. 8 | Bac. 14 | Bac. 16 |
| Ammonia | <10 | 100 | 100 | 100 | <10 |
| Diethylamine | | 10 | 10 | 10 | |
| Trimethylamine | | 10 | 10 | 10 | |
| Pyridine | X | 100 | 10 | 10 | X |
| Benzene [1] | X | | | | 100 |

[1] Probably a solvate.

Example 9

The inhibiting concentration of representative complexes of substituted triphenylboranes against various organisms was determined, with the following results:

| Complex | pK$_b$ | Inhibitory dose to indicated organism (p.p.m.) | | | | Thallophyticidal index |
|---|---|---|---|---|---|---|
| | | Alg. 1 | Alg. 2 | Fun. 3 | Bac. 4 | |
| Tri-p-fluorophenyl-borane: ammonia | 4.74 | 1 | 1 | 100 | | 201 |
| Tri-p-methoxyphenyl-borane: ammonia | 4.74 | 1 | 1 | X | | 200 |
| Tri-p-fluorophenyl-borane: pyridine | 8.64 | 1 | 1 | 100 | | 201 |
| Tri (p-tolyl) borane ammonia | 4.74 | 1 | 1 | X | | 200 | phatic amines are applied to various representative organisms in vitro with the following results:

| Complex of triphenyl-borane with the following— | Inhibitory dose to indicated organisms (p.p.m.) | | | | |
|---|---|---|---|---|---|
| | pK$_b$ | Alg. 1 | Alg. 2 | Fun. 3 | Bac. 4 | Thallophyticidal index |
| Methylamine | 3.19 | 1 | 1 | 100 | 10 | 211 |
| Dodecylamine | 3.7 | 1 | 1 | 10 | 10 | 220 |
| n-Tetradecyl amine | 3.8 | 1 | 1 | 10 | 100 | 211 |
| Ethylenediamine | 4.07 | 1 | 1 | 100 | 100 | 202 |
| Hexamethylene diamine | Ca. 4 | 10 | 1 | 100 | ------ | 111 |
| Tetrahydrofurfuryl aminoethanol | Ca. 5 | 1 | 1 | 100 | 100 | 202 |
| Acetylacetone imide | Ca. 5 | 1 | 1 | 100 | 100 | 202 |
| Benzylamine | 4.62 | 1 | 1 | 100 | 100 | 202 |

| Complex of triphenylborane with the following— | Inhibitory dose to indicated organism (p.p.m.) | | | |
|---|---|---|---|---|
| | Fun. 5 | Bac. 11 | Bac. 12 | Bac. 16 |
| Methylamine | ------ | ------ | 100 | ------ |
| Dodecylamine | 100 | 100 | 10 | 10 |
| n-Tetradecyl amine | 100 | X | 100 | 100 |
| Ethylenediamine | 100 | 100 | 100 | 100 |
| Hexamethylene diamine | 100 | ------ | 100 | ------ |
| Tetrahydrofurfuryl aminoethanol | 100 | 100 | 10 | 100 |
| Acetylacetone imide | 100 | 100 | 100 | 100 |
| Benzylamine | 100 | 100 | 100 | 100 |

Two of the complexes from the preceding tables are further evaluated as thallophyticides as shown below.

| Complex of triphenylborane with the following— | Inhibitory dose to indicated organism (p.p.m.) | | | | | | | |
|---|---|---|---|---|---|---|---|---|
| | Fun. 6 | Bac. 7 | Bac. 8 | Bac. 9 | Bac. 10 | Bac. 13 | Bac. 14 | Bac. 15 | Bac. 17 |
| Methylamine | 100 | ------ | 100 | ------ | 100 | ------ | 100 | ------ | ------ |
| Dodecylamine | <10 | <10 | <10 | <10 | X | <10 | ------ | 10 | 100 |

Example 3

Aqueous solutions containing complexes of triphenylborane with a number of secondary aliphatic amines were applied to various representative organisms with the following results:

| Complex of triphenyl-borane with the following— | Inhibitory dose to indicated organisms (p.p.m.) | | | | | |
|---|---|---|---|---|---|---|
| | pK$_b$ | Alg. 1 | Alg. 2 | Fun. 3 | Bac. 4 | Thallophyticidal index |
| Triethylenetetramine | Ca. 3 | 1 | 1 | 100 | 10 | 211 |
| N-alkyl propylene diamine [1] | Ca. 3 | 1 | 1 | 100 | 10 | 211 |
| n-dodecyl propylene diamine [2] | Ca. 3 | 1 | 1 | 100 | 100 | 202 |
| N-alkyl propylene diamine [3] | Ca. 3 | 1 | 1 | 100 | 100 | 202 |
| Dimethylamine | 3.31 | 1 | 1 | 100 | 10 | 211 |
| Di-n-propylamine | 3.0 | 1 | 1 | 100 | 10 | 211 |
| N-methylethanol amine | Ca. 5 | 1 | 1 | 100 | 100 | 202 |
| Piperidine | 2.79 | 1 | 1 | 10 | 10 | 220 |
| Piperazine | 4.19 | 1 | 1 | 100 | 100 | 202 |
| Morpholine | Ca. 5 | 1 | 1 | 100 | 100 | 202 |

[1] Available from the Armour Company under the trade designation "Duomeen S." This diamine has an iodine value of 5–15, a melting range of 20–24° C. and a diamine content of not less than 80%.
[2] Available from the Armour Company under the trade designation "Duomeen 12."
[3] Available from the Armour Company under the trade designation "Duomeen C." This diamine has an iodine value of about 50, a melting range of 38–48° C. and a diamine content of not less than 80%.

| Complex of triphenylborane with the following— | Inhibitory dose to indicated organism (p.p.m.) | | | |
|---|---|---|---|---|
| | Fun. 5 | Bac. 11 | Bac. 12 | Bac. 16 |
| Triethylenetetramine | 100 | 100 | 10 | 10 |
| Duomeen S | 100 | 100 | 10 | 100 |
| N-dodecyl propylene diamine | 100 | 100 | 100 | 100 |
| Duomeen C | 100 | 100 | 100 | 100 |
| Dimethylamine | ------ | ------ | 100 | ------ |
| Di-n-propylamine | 100 | 100 | <10 | 10 |
| N-Methyl ethanolamine | 100 | 100 | 100 | 100 |
| Piperidine | ------ | ------ | 2 | ------ |
| Piperazine | 100 | 100 | <10 | 100 |
| Morpholine | 100 | 100 | 100 | 8 |

Four of the complexes from the preceding table are further evaluated as thallophyticides as shown below:

| Complex of triphenylborane with the following— | Inhibitory dose to indicated organism (p.p.m.) | | | | | | | | |
|---|---|---|---|---|---|---|---|---|---|
| | Fun. 6 | Bac. 7 | Bac. 8 | Bac. 9 | Bac. 10 | Bac. 13 | Bac. 14 | Bac. 15 | Bac. 17 |
| Triethylenetetramine | 100 | <10 | <10 | <10 | X | 100 | ------ | 100 | 100 |
| Dimethylamine | 100 | ------ | 100 | ------ | 100 | ------ | ------ | ------ | ------ |
| Di-n-propylamine | 100 | <10 | <10 | <10 | X | 100 | ------ | 100 | 100 |
| Piperidine | 10 | 10 | 10 | 10 | X | ------ | ------ | ------ | ------ |

Example 4

Complexes of triphenylborane with several tertiary aliphatic amines were used to inhibit growth of various representative organisms with the following results:

| Complex of triphenylborane with the following— | Inhibitory dose to indicated organism (p.p.m.) | | | | | |
|---|---|---|---|---|---|---|
| | pK$_b$ | Alg. 1 | Alg. 2 | Fun. 3 | Bac. 4 | Thallophyticidal index |
| Trimethylamine | 4.13 | 1 | 1 | 100 | 10 | 211 |
| Tri-n-propylamine | 3.26 | 1 | 1 | 100 | 10 | 211 |
| 3-Dimethylaminopropylamine | Ca.4 | 1 | 1 | 100 | 100 | 202 |

| Complex of triphenylborane with the following— | Inhibitory dose to indicated organism (p.p.m.) | | | | | |
|---|---|---|---|---|---|---|
| | Fun. 5 | Fun. 6 | Bac. 8 | Bac. 11 | Bac. 12 | Bac. 14 | Bac. 16 |
| Trimethylamine | ------ | 100 | 100 | ------ | 100 | 100 | ------ |
| Tri-n-propylamine | 100 | ------ | ------ | 100 | 100 | ------ | 100 |
| 3-Dimethylaminopropylamine | 100 | ------ | ------ | 100 | 100 | ------ | 100 |

Example 5

The inhibitory dose of each of a number of complexes of triphenylborane with representative phosphines was determined against various organisms with the following results:

| Complex of triphenylborane with the following— | Inhibitory dose to indicated organisms (p.p.m.) | | | | | |
|---|---|---|---|---|---|---|
| | pK$_b$ | Alg. 1 | Alg. 2 | Fun. 3 | Bac. 4 | Thallophyticidal index |
| Tributylphosphine | Ca.3 | 1 | 1 | 100 | 100 | 202 |
| Phenyl-diethylphosphine | Ca.4 | 1 | 1 | X | 100 | 201 |
| Phenyl-dipropylphosphine | 3.4 | 1 | 1 | X | 100 | 201 |

| Complex of triphenylborane with the following— | Inhibitory dose to indicated organism (p.p.m.) | | | | | |
|---|---|---|---|---|---|---|
| | Fun. 5 | Fun. 6 | Bac. 7 | Bac. 8 | Bac. 11 | Bac. 12 |
| Tributylphosphine | 100 | 100 | 100 | 10 | 100 | 100 |
| Phenyl-diethylphosphine | 100 | X | ------ | 100 | ------ | X |
| Phenyl-dipropylphosphine | X | X | ------ | 100 | ------ | X |

| Complex | Inhibitory dose to indicated organism (p.p.m.) | | | | | | | | |
|---|---|---|---|---|---|---|---|---|---|
| | Fun. 5 | Fun. 6 | Bac. 7 | Bac. 8 | Bac. 10 | Bac. 11 | Bac. 12 | Bac. 13 | Bac. 14 |
| Tri-p-fluorophenyl-borane: ammonia | 10 | 100 | 100 | 10 | X | 10 | 10 | 10 | 10 |
| Tri-p-methoxy-phenyl-borane: ammonia | | X | 100 | 100 | X | | X | 10 | 100 |
| Tri-p-fluorophenyl-borane: pyridine | | 100 | 100 | 10 | 100 | | 100 | | 10 |
| Tri (p-tolyl) borane: ammonia | | | >100 | 10 | X | | X | | 100 |

*Example 10*

Inhibiting concentrations of a number of complexes of triphenylborane with weakly basic materials some of which are Lewis bases having $pK_b$ values greater than about 10 were determined with the following results:

| Mixture of triphenyl-borane with the following— | Inhibitory dose to indicated organism (p.p.m.) | | | | | |
|---|---|---|---|---|---|---|
| | $pK_b$ | Alg. 1 | Alg. 2 | Fun. 3 | Bac. 4 | Thallo-phytici-dal index |
| Control—no added basic material | | 10 | 10 | X | X | 20 |
| p-Chloroaniline | >Ca. 10 | 10 | 10 | X | X | 20 |
| p-Aminophenol | >Ca. 10 | 10 | 10 | X | X | 20 |
| Benzidine | 9.03 | 10 | 10 | 100 | 100 | 22 |
| 2,5-dimethyl-pyrazine | >Ca. 10 | 10 | 10 | X | X | 20 |
| 2,4-dimethyl-thiazole | >Ca. 10 | 10 | 10 | 10 | 100 | 31 |
| 5-hydroxyisoquinoline | >Ca. 10 | 10 | 10 | 100 | 100 | 22 |
| Aniline | 9.27 | 10 | 10 | 100 | 100 | 22 |
| Octadecyl amine | Ca. 4 | 10 | 10 | 10 | 10 | 40 |
| 1,1-dihydro-perfluoro-hexylamine | >Ca. 10 | 10 | 100 | X | X | 11 |
| p-Dodecylaniline | Ca. 9.3 | 10 | 100 | X | X | 11 |
| 4-benzoylpyridine | >Ca. 10 | 10 | 10 | 100 | 100 | 22 |

*Example 11*

A number of triphenylborane complexes were evaluated to determine their utility for inhibition of spore germination of *Monolinia fructicola* (an ascomycete related to the various rust organisms which undergoes a sexual stage of reproduction and which causes brown rot of peaches and other stone fruits) and *Alternaria oleracea* (a typical imperfect fungus, i.e. one in which a sexual reproduction has not been demonstrated, which usually causes slight damage to foliage) by the following method, which is substantially that adopted by the American Phytopathological Society and described in Phytopathology, vol. 33, pp. 627–632 (1943): Spores of the two fungi are produced by culturing on potato-dextrose agar slants, removed in distilled water, washed by centrifugation and suspended in sucrose-citrate solution at a concentration of 250,000 spores per milliliter. A small amount of this suspension is added to 2 ml. portions of the compound to be tested at concentrations of 1, 10, 100 and 1000 parts per million and mixed thoroughly. Two drops of each such suspension are placed on a glass slide and held at 72° C. for 20 hours under 100 percent relative humidity and germination of spores is observed. The following table shows the minimum concentration at which there is no germination of spores. This test demonstrates the strongly fungistatic activity of the compounds.

| Complexes of triphenylborane with the following— | Inhibiting concentration, p.p.m. | |
|---|---|---|
| | Monilinia fructicola | Alternaria oleracea |
| Ammonia | 1 | 1 |
| Decylamine | 0.1 | 0.1 |
| Dodecylamine | 0.1 | 10 |
| Duomeen 12 | 1 | 10 |
| Duomeen C | 0.1 | 1 |
| Piperidine | 1 | 1 |
| Aniline | 1 | 1 |
| p-Toluidine | 0.1 | 0.1 |
| Pyridine | 1 | 10 |
| 4-ethyl pyridine | 1 | 1 |

*Example 12*

Samples of triphenylborane ammonia, triphenylborane pyridine, triphenylborane methylamine, triphenylborane dimethylamine and triphenylborane trimethylamine were tested to determine their anti-fungal activity by the following technique: Poured agar plates are seeded with the spores of the test fungus. A small amount of the compound to be tested is placed in the center of the plates, after which they are incubated until heavy growth of the fungus occurs. The width of zones of inhibition surrounding the test samples are recorded. The results of the tests are shown in the following table.

| | Width of zone of inhibition, mm. | | | | |
|---|---|---|---|---|---|
| | Triphenyl borane ammonia | Triphenyl borane pyridine | Triphenyl borane mono-methyl-amine | Triphenyl borane dimethyl-amine | Triphenyl borane tri-methyl-amine |
| Alternaria solani | 10 | 1 | 5 | 14 | 23 |
| Aspergillus niger | 4 | 2 | 4 | 7 | 16 |
| Rhizopus nigricans | 6 | 1 | 6 | 11 | 18 |
| Stemphylium sp | 5 | 7 | 10 | 10 | 20 |
| Glomerella cingulata | 4 | 1 | 3 | 13 | 20 |
| Trichophyton mentagrophytes [1] | 9 | 3 | 10 | 18 | 20 |
| Microsporum gypseum [2] | 6 | 5 | 11 | 19 | 15 |
| Microsporum audouini [2] | 6 | 5 | 10 | 20 | 22 |

[1] "Tinea cruris"; regarded as synonomous with *T. gypseum* and *T. interdigitale*.
[2] "Scalp Ringworm" causative organism.

*Example 13*

Triphenylborane complexes with ammonia, dimethylamine and pyridine are tested for effectiveness against human pathogens. Small portions of each compound are placed on the surface of Sabouraud dextrose agar plates previously inoculated by streaking with the test organisms and the plates are then incubated for the time shown at 23° C. Inhibition is rated visually from 0 (no inhibition) to 4 (excellent inhibition). The following table shows the average results of six separate tests.

| Organism | Incubation period before reading (days) | Triphenyl-borane ammonia | Triphenyl-borane dimethyl-amine | Triphenyl-borane pyridine |
|---|---|---|---|---|
| Fusarium oxysporum | 6 | 3 | 3 | 0 |
| Microsporum gypseum | 6 | 3 | 4 | 2 |
| Trichophyton mentagrophytes | 6 | 4 | 3 | 3 |
| Epidermophyton floccosum | 10 | 3 | 4 | 2 |

The somewhat greater effectiveness exhibited by the complexes with lower molecular weight nitrogenous bases is probably due to greater solubility and diffusibility under the test conditions. A similar difference in effect is observed when the complexes with ammonia and pyridine are compared for toxicity and for corneal and skin irritation. The complex with ammonia shows greater oral toxicity in rats. When applied as 10 percent (w./v.)

suspension in corn oil, it also shows more severe corneal irritation in rabbits but is not irritating to the sheared skin of rabbits at this concentration.

Example 14

Fifty ml. quantities of potato dextrose agar (prepared in distilled water) are measured into 125 ml. Erlenmeyer flasks and autoclaved at 15 p.s.i. for 15 minutes. The amount of complex required to achieve the desired test concentration is added to the sterile medium while it is still liquid. The complexes are formulated as 50% wettable powder concentrates and the required test dosages are prepared by dilution of the concentrates with water. The inert portion of the concentrates consists of 92% of a hydrated silica pigment of extremely small particle size (available under the trade designation "Hi-Sil 101" from the Columbia Southern Chemical Corp., Pittsburgh, Pennsylvania), 4% of a nonionic surfactant which is a reaction product of ethylene oxide and polypropylene glycol (available under the trade designation "Pluronic L-61" from the Wyandotte Chemicals Corporation) and 4% of a lignosulfonate dispersing agent (available under the trade designation "Marasperse N" from the Marathon Corporation, a division of the American Can Company).

Approximately 25 ml. portions of the complex-containing media are then poured into sterile plastic Petri plates. After they have solidified, the plates are seeded with the following organisms.

*Bacillus subtilis*—a saprophytic, gram positive, spore forming bacterium.

*Xanthomonas phaseoli*—a plant-pathogenic, gram negative, non-spore forming bacterium.

*Helminthosporium sativum*—a plant pathogenic fungus.

*Yeast*—a mixture of Torula and Saccharomyces species.

The data recorded in the following table indicates whether any growth is observed at the end of 72 hours of incubation at 72–74° F. (− denotes no growth, + denotes growth).

| Complexes of triphenylborne with the following— | Conc. p.p.m. | Bacillus subtilis | Xanthomonas phaseoli | Hel. sativum | Yeast |
|---|---|---|---|---|---|
| Ammonia | 5,000 | − | − | − | − |
| Trimethyl amine | 5,000 | − | − | − | − |
| Sodium hydroxide | 40 | − | − | − | − |
| Pyridine | 5,000 | − | − | − | − |
| Control—untreated medium | | + | + | + | + |

Example 15

The inhibition of the fungi *Graphium ulmi* and *Fusarium oxysporum* by several of the complexes of the invention, is demonstrated as follows. (The inhibition of each of these fungi is of practical importance, particularly in the case of *Graphium ulmi*, the fungus which causes Dutch elm disease.) The following procedure is utilized: Portions of a potato dextrose agar are poured into culture tubes each of which contains a constriction near its open end which forms a dam for liquid in the test tube when it is laid on its side. Appropriate amounts of the complexes to be tested are mixed into the liquid agar in the tubes; the tubes are laid on their sides, and the agar is allowed to solidify. Each tube is then inoculated at a point just behind the dam with a test fungus and is allowed to incubate for several days at approximately 22° C. At the end of the incubation period, the distance (in millimeters) that the fungus has spread across the surface of the treated agar toward the closed end of the test tube is recorded as a measure of the effectiveness of the treatment. The results are as follows:

| Complexes of triphenylborane with the following— | Linear growth (in millimeters) of *Graphium ulmi* across agar containing various concentrations of the complexes over a seven-day incubation period | | | |
|---|---|---|---|---|
| | 500 p.p.m. | 250 p.p.m. | 125 p.p.m. | 63 p.p.m. |
| Tetradecylamine | 0 | 0 | 0 | 0 |
| Duomeen 12 | 0 | 0 | 0 | 0 |
| Duomeen C | 0 | 0 | 0 | 0 |
| Piperidine | 0 | 0 | 0 | 0 |
| Control | 35.5 | | | |

| Complexes of triphenylborane with the following— | Linear growth in (millimeters) of *Graphium ulmi* across agar containing various concentrations of the complexes over a four-day incubation period | | | |
|---|---|---|---|---|
| | 50 p.p.m. | 25 p.p.m. | 5 p.p.m. | 1 p.p.m. |
| Ammonia | 0 | 0 | 18.0 | 19.7 |
| Tetradecylamine | 0 | 2 | 18.3 | 18.7 |
| Duomeen 12 | 0 | 0 | 19.7 | 22.0 |
| Duomeen C | 0 | 0 | 18.3 | 21.0 |
| Piperidine | 0 | Trace | 18.3 | 20.7 |
| Trimethylamine | 0 | 3.5 | 20.3 | 21.0 |
| Pyridine | 0 | 0 | 19.0 | 21.3 |
| Control | 23.2 | | | |

| Complexes of triphenylborane with the following— | Linear growth (in millimeters) of *Fusarium oxysporum* across agar containing various concentrations of the complexes over a four-day incubation period | |
|---|---|---|
| | 50 p.p.m. | 25 p.p.m. |
| Ammonia | 0 | 20.0 |
| Piperidine | 0 | 19.0 |
| Trimethylamine | | 28.0 |
| Pyridine | Trace | Trace |
| Control | 31.5 | |

These results demonstrate that the complexes used have a very high degree of fungitoxicity with respect to both of the fungi tested.

The triphenylborane complexes are further evaluated in vivo against a number of representative phytopathogenic fungi in Examples 16 through 20 by the standard test methods indicated below, with the results shown. Unless otherwise described, suspensions of the compounds evaluated in this series of examples are prepared by dissolving 400 mgm. of each compound in 5 ml. of acetone, adding 6 ml. of 0.5 percent of a surfactant (Triton X–155, alkyl aryl polyether alcohol) and diluting with distilled water to make 200 ml. of solution, containing 2000 parts per million of the compounds. Lower concentrations are obtained by suitable further dilutions.

Example 16

The control of early blight of tomatoes by representative triarylborane complexes is demonstrated as follows. Tomato plants of the variety "Bonny Best" are grown in 4 inch pots until about 8 inches tall. They are drenched with a suspension of the chemical used according to the method of McCallan and Wellman as further modified by McCallan and described in Contributions of the Boyce Thompson Institute, vol. 13, No. 3, pp. 93–134 (1943), and vol. 14, No. 2, pp. 71–75 (1948).

The plant is placed on a turntable and rotated slowly while the suspension employed is applied through a paint spray gun adjusted to spray 220 ml. per minute at 40 p.s.i. air pressure. Each plant is sprayed for as long as required to wet the leaf surfaces without run-off. The plant is then permitted to dry and it is sprayed at 20 p.s.i. air pressure during 20 seconds with 10 ml. of a suspension of 75,000 spores of *Alternaria solani* per ml. A number of untreated plants are provided, for control purposes.

The spore suspension is prepared by irradiating a 5-day old culture of the organism on potato-dextrose agar in a Petri dish with ultraviolet light and harvesting the spores 48 hours later. They are brushed into distilled water with a rubber policeman, filtered through cheese cloth to remove mycelium and coarse particles of culture medium, washed by centrifugation and diluted to the desired concentration.

After application of the spores, the plant is held at 98 to 100 percent relative humidity at 70° F. for 24 hours and three days later, the small lesions caused by infection from viable spores are counted. The percentage of effectiveness of the various treatments are measured by comparison with similarly infected control plants. The results of various treatments, at three levels of concentration, are reported in the following table.

| Complexes of triphenylborane with the following— | Concentration applied, p.p.m. | | |
|---|---|---|---|
| | 80 | 16 | 3.2 |
| | Percent effectiveness | | |
| Ammonia | 81 | 0 | |
| Decylamine | 97 | 72 | 29 |
| Dodecylamine | 96 | 95 | 36 |
| Tetradecylamine | 99 | 88 | 24 |
| Octadecylamine | 99 | 84 | 51 |
| N-dodecylpropylene diamine | 98 | 85 | 28 |
| $NH_2(CH_2)_3NHR$* | 98 | 55 | 25 |
| Piperidine | 99 | 89 | 62 |
| Aniline | 99 | 94 | 79 |
| p-Toluidine | 86 | 89 | 66 |
| Phenyldibutylphosphine | 48 | 0 | |
| Pyridine | 99 | 82 | 69 |
| 4-ethyl pyridine | 99 | 75 | 57 |

*"Duomeen C."

*Example 17*

Control of bean rust by a number of triaryl borane complexes is demonstrated by a procedure similar to that set forth in Example 16. Infected plants are prepared as follows. Beans (*Phaseolus vulgaris* var. Pinto) are grown in 4 inch pots until the cotyledons are fully expanded. They are thinned to 4 plants per pot and sprayed for 30 seconds at 40 p.s.i. air pressure with a 0.5 percent suspension of the spores of *Uromyces phaseoli* harvested from infested plants. The plants are grown at 60° F. for 24 hours, at 98 to 100 percent relative humidity, to establish infection. After 3 days, the selected compound is applied by spraying as a suspension (prepared as described above), a number of pots being left untreated to serve as controls. About 7 days later the number of lesions are counted and compared with the controls to determine the percent of effectiveness. The results, in terms of percent effectiveness of various treatments at the indicated concentrations, are reported in the following table.

| Complexes of triphenylborane with the following— | Concentration applied, p.p.m. | |
|---|---|---|
| | 80 | 16 |
| Ammonia | 64 | 46 |
| Dodecylamine | 80 | 59 |
| Tetradecylamine | 75 | 74 |
| N-dodecylpropylene diamine | 67 | 42 |
| Phenyl dibutylphosphine | 81 | 80 |

*Example 18*

Representative complexes were evaluated for control of late blight of tomatoes by a procedure similar to that of Example 16. Sporangia of *Phytophthora infestans* are cultured on sterile wheat at 22° C., harvested and incubated for 2 hours in tap water at 5° C., so that swarm spores emerge. This suspension is then applied to tomato plants previously sprayed with the selected complex and dried as in Example 16.

The tomato plants are held for 24 hours at 60° F. and 98 to 100 percent relative humidity and then grown for 7 days. Because there is a tendency for fusion of lesions, control is rated by a numerical system as folows:

0—no infection
1—slight infection
2—moderate infection
3—severe infection

The results obtained were found to be as follows:

| Complexes of triphenylborane with the following— | Control rating of *Phytophthora infestans* at specified concentrations | | |
|---|---|---|---|
| | 80 p.p.m. | 16 p.p.m. | 3.2 p.p.m. |
| Ammonia | 1 | 1-2 | |
| Piperidine | 2 | 3 | 3 |
| Aniline | 1 | 2 | 3 |
| Pyridine | 2-3 | 2-3 | 3 |

A second series of compounds were evaluated using the same procedure. The results are reported in the following table, and the effectiveness is rated as percent control of the fungus.

| Complex of triphenylborane with the following— | Percent control of *Phytophthora infestans* at specified concentrations | | |
|---|---|---|---|
| | 80 p.p.m. | 16 p.p.m. | 3.2 p.p.m. |
| Decylamine | 100 | 100 | 59 |
| Dodecylamine | 98 | 84 | 49 |
| Tetradecylamine | 96 | 72 | 0 |
| Octadecylamine | 100 | 86 | 85 |
| N-dodecylpropylene diamine | 100 | 80 | 78 |
| $NH_2(CH_2)_3NHR$* | 100 | 100 | 39 |
| p-Toluidine | 88 | 73 | 55 |
| Phenyl dibutyl phosphine | 81 | 9 | |
| 4-ethyl pyridine | 98 | 70 | 64 |

*"Duomeen C."

*Example 19*

The effectiveness of certain of the complexes in controlling organisms causing decay of seeds is shown as follows: Soil heavily infected with seed-decaying or damping-off organisms, mainly *Pythium ultimum*, is potted in three-inch pots. Fifty ml. drench treatments of the respective complexes are applied at total dosages of 50, 25, and 12.5 milligrams per pot. Ten seeds of *Pisium sativum* var. susceptible Perfection peas are planted in each pot 48 hours after the drench treatment and the effectiveness of the complexes in controlling the seed-decaying organisms is measured as the percent appearance or emergence of seedlings from the seeds. The results of treatment with various complexes expressed in terms of percent emergence of the seedlings are given in the following table at the three dosages indicated.

| Complex of triphenylborane with the following— | Percent emergence of pea seedlings at indicated dosages (mg./pot) | | |
|---|---|---|---|
| | 50 | 25 | 12.5 |
| Decylamine | 80 | 60 | 80 |
| Dodecylamine | 100 | 100 | 80 |
| Tetradecylamine | 60 | | |
| Octadecylamine | 80 | 40 | 40 |
| N-dodecylpropylene diamine | 100 | 100 | 60 |
| $NH_2(CH_2)_3NHR$ ("Duomeen C") | 60 | | |
| Phenyl dibutyl phosphine | 20 | | |
| Control (no treatment) | 0 | 0 | 0 |

In a similar procedure (except that four-inch pots are used), ten of the pea seeds are planted in the infected soil which is then watered with 100 ml. of an aqueous solution, containing 100 mgm. of the complex of triphenylborane with ammonia. The pots are placed on benches and emergence after 10 days is determined as well as subsequent growth or damping-off. It is found that there is some retardation of germination, but there is about 60 to 90 percent emergence with about 50 to 60 percent stand of plants not stunted or subsequently damped-off, even when planting of seeds is delayed for 6 days after treatment of the soil.

In another series in which various complexes according to the invention are evaluated, the following procedure is used: The complexes are prepared for testing as 25% dust concentrates in a finely divided inert diluent, such as diatomaceous earth or a clay. The chemicals are applied directly to susceptible peas of the variety Laxtons Progress by tumbling them with weighed amounts of seed until the seed is uniformly and evenly coated with the desired amount of chemical. Two sheets of paper towel are next wetted by immersion in water and heavily infested Pythium soil then spread over the towels to a depth of about ¼ of an inch. Fifty treated seeds are uniformly distributed over the soil, a third wet towel placed on top and the whole is rolled up to form a so-called "doll." Three "dolls" constituting three replicates are prepared per treatment. The "dolls" are then placed in aluminum containers and held at 45° to 50° F. for four days after which they are removed to room temperature and held for an additional three to four days to permit germination of the seed. Three "dolls" of untreated seeds in infested soil constitute the control. Untreated seeds in "dolls" of vermiculite give an index of the germinability of the seed lot being used and establishes the amount of growth possible under the conditions used, as a check. In addition, several lots utilizing 2,3-dichloro-1,4-naphthoquinone (a commercially available chemical which is useful in controlling pre-emergence "damping-off" of peas) are added for comparison.

At termination of the procedure, the "dolls" are opened and the seed examined for:

(1) Number germinated with roots over ¼ inch in length.
(2) Seeds firm and free from rot.
(3) Seeds rotted and decomposed.
(4) Root damage or other abnormal growth characteristics.

The results obtained are summarized in the following table:

| Treatment: Complex of triphenylborane with the following— | Dosage oz./bu. | Percent germination | Percent disease control |
| --- | --- | --- | --- |
| Piperidine | 1 4 | 58 | 82 |
|  | 1 2 | 55 | 80 |
|  | 1 | 56 | 79 |
|  | ½ | 71 | 80 |
|  | ¼ | 48 | 64 |
| Ammonia | 4 | 65 | 96 |
|  | 2 | 74 | 92 |
|  | 1 | 71 | 83 |
|  | ½ | 83 | 88 |
|  | ¼ | 75 | 82 |
| Trimethyl amine | 4 | 89 | 100 |
|  | 2 | 73 | 96 |
|  | 1 | 87 | 93 |
|  | ½ | 79 | 88 |
|  | ¼ | 54 | 80 |
| Sodium hydroxide | 4 | 36 | 64 |
|  | 2 | 48 | 72 |
|  | 1 | 42 | 70 |
| 2,3-dichloro-1,4-naphthoquinone | 4 | 42 | 37 |
|  | 2 | 16 | 19 |
|  | 1 | 17 | 13 |
|  | ½ | 8 | 3 |
|  | ¼ | 0 | 0 |
| Control | 0 | 8 | 0 |
| Check (vermiculite) | 0 | 93 | |

¹ Some injury to the seeds noted.

Example 20

The complex of triphenylborane with ammonia was employed in the procedure described in Example 19 in which untreated seeds are planted in infected, previously drench-treated soil. In this case, four-inch pots are utilized and filled with soil heavily infected with *Rhizoctonia solani*, and drenched with 100 ml. of an aqueous solution containing 100 mg. of the complex. Cotton seedlings are then planted in the pots and emergence is determined as before. There is about 90 percent emergence of seedlings (the initial growth of which is somewhat retarded), but there is no damping off of the seedlings caused by this mold.

Example 21

The compounds were evaluated from control of the fungi *Helminthosporium sativum* and *Alternaria sp.* contained within and on the surface of naturally infected barley seed as follows: Heavily infected seed is immersed for 15 minutes in aqueous solutions of the various complexes at the indicated concentrations. The complexes are formulated as 50% wettable powder concentrates and the required dosages are prepared by dilution of the concentrates with water. The inert portion of the concentrates consists of 92% of "Hi-Sil 101" bulk extender, 4% of "Pluronic L-61" wetting agent and 4% of "Marasperse N" dispersing agent. After 15 minutes' immersion, the solution is drained off and the seed is plated out on petri dishes containing moistened filter paper. Lack of control is indicated by the dark colored organism sporulating in profusion on the seed surface and on the filter paper adjoining the seed. Data recording percent germination and percent uninfected seeds are taken seven days after initiation of the test, the percent germination indicating the relative safety or phytotoxicity of the chemical.

| Complex | Concentration, p.p.m. | Percent germination | Percent uninfected seeds |
| --- | --- | --- | --- |
| Triphenylborane: ammonia | 10,000 | 26 | 100 |
|  | 1,000 | 66 | 100 |
|  | 100 | 84 | 92 |
| Triphenylborane: piperidine | 10,000 | 84 | 100 |
|  | 1,000 | 92 | 76 |
|  | 100 | 92 | 52 |
| Triphenylborane: trimethylamine | 10,000 | 0 | 100 |
|  | 1,000 | 82 | 100 |
|  | 100 | 100 | 98 |
|  | 10 | 98 | 66 |
| Triphenylborane: pyridine | 10,000 | 74 | 100 |
|  | 1,000 | 72 | 80 |
|  | 100 | 76 | 56 |
| Triphenylborane: sodium hydroxide | 10,000 | 0 | 100 |
|  | 1,000 | 32 | 100 |
|  | 100 | 40 | 99 |
| Trinaphthylborane: ammonia | 10,000 | 98 | 84 |
|  | 1,000 | 94 | 70 |
|  | 100 | 94 | 36 |
| Trinaphthylborane: pyridine | 10,000 | 86 | 58 |
|  | 1,000 | 92 | 62 |
|  | 100 | 86 | 48 |
| Trinaphthylborane: benzene | 10,000 | 88 | 94 |
|  | 1,000 | 82 | 72 |
|  | 100 | 96 | 38 |
| Untreated control |  | 88–90 | 30–40 |

Example 22

The utility of the complexes of the invention for control of root-rot in peas is shown by the results of the following procedure: Levels of treatment of 20, 40, and 80 mg. per 5-inch pot (i.e. 3 pounds of soil) are utilized in four replicates. Each pot is steam sterilized and then inoculated and tested according to the following schedule:

| Elapsed time from sterilization (days) | Operation [1] |
|---|---|
| 0 | Pea seedlings infested with *Aphanomyces euteiches* (the causal fungus of pea root-rot) planted. |
| 46 | All plants observed to be dead or dying; tops removed. |
| 55 | Soil in pots drenched with aqueous suspension of the zoospores of the fungus.[2] |
| 62 | Second zoospores suspension applied; chemicals mixed into soil.[2] |
| 63 | Six pea seeds planted in each pot. |
| 69 | Third zoospores suspension applied.[2] |
| 102 | Final notes made on root-rot reading and plant height. |

[1] A high level of moisture was maintained throughout the entire period.
[2] A total of about 3,400,000 zoospores were added to each pot in the three applications.

The effects of the chemical treatments upon plant height and root rot level of the peas were found to be as follows:

| Treatment | Rate, mg/pot | Total plants | | Appearance, score [2] 3/16 | Plant ht., inches | Root-rot index [3] |
|---|---|---|---|---|---|---|
| | | Emerged, 72 days [1] | Scored, 102 days [1] | | | |
| Sterile control | | 20 | 22 | 0.8 | 12.8 | 2.0 |
| Inoculated control | | 22 | 24 | 5.2 | 6.2 | 9.5 |
| | | 22 | 23 | 4.0 | 5.1 | 7.8 |
| | | 21 | 22 | 4.2 | 5.9 | 6.6 |
| Triphenylborane: pyridine | 20 | 21 | 22 | 2.2 | 9.1 | 5.1 |
| | 40 | 22 | 23 | 1.2 | 10.2 | 4.2 |
| | 80 | 23 | 23 | 1.5 | 9.7 | 5.9 |
| Triphenylborane: trimethylamine | 20 | 22 | 22 | 3.0 | 8.4 | 6.8 |
| | 40 | 23 | 23 | 1.8 | 10.4 | 3.6 |
| | 80 | 22 | 24 | 1.0 | 8.4 | 1.9 |

[1] Elapsed time from sterilization.
[2] Scored for above-the-ground symptoms: 0=no symptoms; 6=all plants dead.
[3] Root-rot index: 1=no symptoms; 10=all plants dead.

*Example 23*

The inhibition of growth of microorganisms in water which is recirculated through evaporative cooling towers is a useful application of the compounds herein described. Fungi tend to destroy the wooden baffles to such cooling towers while algae, protozoa and bacteria all cause slime. To show the utility of various triarylboranes for this purpose, a series of nine experimental cooling tower models were set up. Each model contained 300 ml. of fresh lake water in a wide mouth jar. A piece of white pine wood, 2 inches by 2 inches by 3/8 inch thick was suspended above the surface at an angle such that one edge was barely touching the surface of the water, and the opposite edge was 1 inch above the surface of the water. A glass tube 5/16 inches in diameter was inserted through the wood 1½ inches from the edge which touches the water and 1 inch from the adjacent edge. The opening of the glass tube was flush with the surface of wood. A slow current of water was circulated from the jar over the piece of wood and thus back into the jar by an air lift pump connected to the glass tube.

All of the jars were placed on a shelf under strong illumination from a fluorescent daylight lamp in order to promote algal growth. The temperature was maintained at 22°±3° C. After 17 days with circulation of water as described, the contents of each vessel was examined. The water was found to be turbid owing to the growth of various microorganisms. One vessel was then continued untreated as a control and the others were treated with thallophyticidal compositions of the invention by addition of amounts of triarylborane complexes at levels of 1 part per million or at 10 parts per million. Circulation of water was continued and the vessels were examined as before after 24 hours and again after intervals of one week, two weeks and three weeks. Each of the vessels containing only 1 part per million of triarylborane amine complex was treated with an additional 1 part per million of the same complex at the end of the first week. It was found that at 1 or 2 parts of the complex per million there is some effect as compared to the control on the accumulation of microorganisms which are evident as turbidity in the water and a green sediment on the bottom of the vessel with any of the five complexes employed, namely triphenylborane ammonia, triphenylborane pyridine, tri-p-tolylborane ammonia, tri-(p-fluorophenyl)-borane ammonia and tri-(p-fluorophenyl)borane pyridine. In the three vessels in which triphenylborane ammonia, tri-p-tolylborane ammonia and tri-(p-fluorophenyl)borane ammonia, respectively, were present at 10 ppm. there was a clearly evident effect. The water was visibly less turbid than in the control vessel and the residue on the bottom was less in amount and tends to be abnormally pale and blanched in color clearly demonstrating the thallophyticidal action of these complexes.

*Example 24*

It is found that in water flooding of oil fields for the secondary recovery of oil, the use of an agent to kill sulfate-reducing bacteria results in reduced corrosion of pipes and lessens problems of cleaning well holes. The effect of the bacteria is to produce hydrogen sulfide from sulfates and thereby enhance corrosion of iron and additionally precipitate finely divided ferrous sulfide which tends to plug the porous passageways in the oil producing formation. The utility and effectiveness of the process of the present invention as applied to sulfate-reducing bacteria is illustrated as follows:

An enrichment culture of sulfate-reducing bacteria is isolated in a lactate-salts medium incubated under anaerobic conditions. This culture is used to inoculate tubes of the following medium supplemented with 0.1% yeast extract (percentages given by weight).

| | Percent |
|---|---|
| Potassium monohydrogen phosphate | 0.7 |
| Potassium dihydrogen phosphate | 0.3 |
| Magnesium sulfate heptahydrate | 0.01 |
| Ammonium sulfate | 0.1 |
| Sodium lactate | 0.5 |
| Calcium carbonate | 0.2 |
| Reduced iron powder | 0.2 |
| Sodium chloride | 1.0 |

Water, q.s. to make 100.0%.

One ml. of inoculum was placed in each 27 ml. tube of medium and varying amounts of the triphenylborane complexes of ammonia, pyridine, methylamine, dimethylamine and trimethyl amine were added to the test tubes. Each of these five complexes was found to give complete inhibition of the sulfate-reducing bacteria for the duration of the experiment (10 days) and at the lowest concentration employed (2 p.p.m. for the dimethylamine complex and 1 p.p.m. for the others). The controls were found to grow black with FeS in three days, indicating that the bacteria therein were active.

In a second comparative evaluation, a liquid medium is prepared in distilled water to contain (by weight):

| | Percent |
|---|---|
| Sodium lactate | 0.4 |
| Yeast extract | 0.1 |
| Ascorbic acid | 0.01 |
| Magnesium sulfate heptahydrate | 0.02 |
| Potassium monohydrogen phosphate | 0.001 |
| Ferrous ammonium sulfate hexahydrate | 0.01 |
| Sodium chloride | 1.0 |

Water, q.s. to make 100.0%.

The organism used was a species of sulfate-reducing Desulfovibrio isolated from brackish oil-well-flooding water which grows anaerobically in this medium so readily that the medium becomes black in one day because of precipitation of ferrous sulfide. In duplicate runs, triphenylborane ammonia was included in the medium at concentrations of 0.1 and 0.5 part per million. Similarly, a commercially available germicide used for treatment of oil flooding water was used in comparative runs at 1 and 5 parts per million. The media containing triphenylborane ammonia at 0.5 p.p.m. and the commercial germicide at 5 p.p.m. show complete inhibition for 32 days, that is, there is no precipitation of ferrous sulfide, and that containing triphenylborane ammonia at 0.1 p.p.m. shows complete inhibition for 20 days whereas the commercial germicide at 1 p.p.m. shows no inhibition whatever. Triphenylborane ammonia is thus found to be at least about 10 times as effective as the commercial germicide for inhibiting sulfate-reducing bacteria. Similar results are obtained when other triarylborane complexes are employed.

In a third comparative evaluation, the effect of the complex of triphenylborane with ammonia upon the growth of the sulfate-reducing bacteria in water containing varying salt concentrations was measured. The bacteria, medium and technique used were the same as that set forth immediately above. The results are set forth in the following table, in which + indicates that growth of the bacteria occurred and − indicates inhibition of the bacteria.

| Concentration of sodium chloride, percent | Concentration of triphenylborane-ammonia, p.p.m. | Bacterial growth or inhibition | |
|---|---|---|---|
| | | After 3 days | After 28 days |
| 1 | 0 | + | + |
| | 0 | + | + |
| | 0.1 | − | − |
| | 0.5 | − | − |
| | 1.0 | − | − |
| | 5.0 | − | − |
| 2 | 0 | + | + |
| | 0 | + | + |
| | 0.1 | − | − |
| | 0.5 | − | − |
| | 1.0 | − | − |
| | 5.0 | − | − |
| 4 | 0 | + | + |
| | 0 | + | + |
| | 0.1 | − | − |
| | 0.5 | − | − |
| | 1.0 | − | − |
| | 5.0 | − | − |
| 8 | 0 | − | + |
| | 0 | − | + |
| | 0.1 | − | + |
| | 0.5 | − | + |
| | 1.0 | − | − |
| | 5.0 | − | − |

*Example 25*

In this example, the stability of the triarylborane complexes in soil burial applications and their activity against certain bacteria, yeasts and fungi of the types found in soils are evaluated.

The complexes are formulated as 50% wettable powder concentrates and the required dosages are prepared by dilution of the concentrates with water. The inert portion of the concentrates consists of 92% of "Hi-Sil 101" bulk extender, 4% of "Pluronic L-61" wetting agent and 4% of "Marasperse N," dispersing agent. Concentrates of the complexes to be tested were measured in 10 ml. quantities into test tubes containing sufficient nutrient broth to give the final concentration required. To each tube was then added 1 ml. of uniformly dried and prepared soil containing the organisms. The nutrient broth acts as a food source for the mixture of organisms originating from the soil.

The extent of growth of fungi and bacteria is evidenced by turbidity in the various tubes. Observations and records were made of turbidity at intervals over a period of several days. The effectiveness of the chemicals is expressed as an index of growth inhibition of the various soil-borne bacteria, yeasts and fungi, on the following basis.

Growth index:
    0—No growth
    1—Slight trace of growth
    2—Slight growth
    3—Moderate growth
    4—Heavy growth
    5—Very heavy growth The results of several such evaluations run on the triarylboranes are as follows:

| Complexes of— | Concentration, p.p.m. | Growth index after indicated test period | | | | |
|---|---|---|---|---|---|---|
| | | 2 days | 3 days | 4 days | 5 days | 6 days |
| Triphenylborane-ammonia | 9,000 | 0 | | 0 | 0 | |
| | 900 | 0 | | 1 | 2 | |
| | 90 | 2 | | 5 | 5 | |
| Triphenylborane-trimethylamine | 9,000 | 0 | 0 | 0 | 0 | 0 |
| | 900 | 0 | 0 | 0 | 0 | 0 |
| | 90 | 1 | 1 | 1–2 | 3 | 2 |
| Triphenylborane-pyridine | 9,000 | 0 | | 0 | 2 | |
| | 900 | 0 | | 2 | 4 | |
| | 90 | 2 | | 5 | 5 | |
| Triphenylborane-sodium hydroxide | 9,000 | 0 | | 0 | 0 | |
| | 900 | 0 | | 0 | 0 | |
| | 90 | 2 | | 2 | 3 | |
| Trinaphthylborane-benzene.[1] | 9,000 | 0 | 0 | 0 | | 0 |
| | 900 | 0 | 1 | 1 | | 2 |
| | 90 | 1 | 3 | 4 | | 4 |
| Control, untreated | 0 | 3–5 | 5 | 5 | 5 | 5 |

[1] Solvate.

*Example 26*

In this example, several of the triarylborane complexes are tested as biocides for the protection of wood in soil burial tests. One-inch cubes of white pine are submerged in 0.1% solutions (in ketone solvents) of the chemicals being evaluated, the solutions being contained in beakers. The beakers are placed in vacuum desiccators which are evacuated to below the solvent vapor pressure for approximately one hour, brought to atmospheric pressure and left overnight, the wooden test pieces remaining submerged in the solutions during this time. The blocks are then removed, air dried and placed in jars over rich, moist garden soil and heavily inoculated with a water suspension of the wood-destroying fungus *Pullularia pullulans*. The jars are incubated at room temperature, water being added periodically to maintain highly humid conditions. After periods of 50 days and 64 days of incubation, the blocks are checked for fungus and rated from 0 for no fungus growth to 5 for extreme fungus growth. The results are as follows:

| Chemical: Complex of triphenylborane with— | Fungus growth rating after 50 days' incubation | Fungus growth rating after 64 days' incubation |
|---|---|---|
| Ammonia [1] | 3 | 3 |
| Piperidine [1] | 3 | 3 |
| Aniline [1] | 2 | 3 |
| Pyridine [2] | 3 | 3 |
| Check (blank) [1] | 5 | 5 |

[1] Methyl ethyl ketone solvent.    [2] Acetone solvent.

In another test, one-inch cubes of white pine are soaked for 1–2 hours in solutions of varying concentration of the complex of triphenylborane-ammonia in acetone and incubated and evaluated as above. The results are:

| Concentration of Triphenylborane in acetone solution | Fungus growth rating after 50 days' incubation | Fungus growth rating after 64 days' incubation |
| --- | --- | --- |
| 0 | 3 | 3 |
| 0.001 | 3 | 3 |
| 0.01 | 2 | 3 |
| 0.1 | 0 | 1 |

What is claimed is:

1. A method of inhibiting the growth of microorganisms of the division Thallophyta which comprises contacting the said microorganisms with a thallophyticide selected from the class consisting of:
   (1) triphenylborane,
   (2) alkyl-substituted triphenylboranes,
   (3) halogen-substituted triphenylboranes,
   (4) alkoxy-substituted triphenylboranes,
   (5) trinaphthylborane,
   (6) complexes of triphenylborane with Lewis bases having a $pK_b$ less than about 10,
   (7) complexes of alkyl-substituted triphenylboranes with Lewis bases having a $pK_b$ less than about 10,
   (8) complexes of halogen-substituted triphenylboranes with Lewis bases having a $pK_b$ less than about 10,
   (9) complexes of alkoxy-substituted triphenylboranes with Lewis bases having a $pK_b$ less than about 10 and
   (10) complexes of trinaphthylborane with Lewis bases having a $pK_b$ less than about 10, in an amount effective to inhibit the growth of said microorganisms.

2. A method according to claim 1 wherein said thallophyticide is a complex of triphenylborane with an alkali metal hydroxide.

3. A method according to claim 1 wherein said thallophyticide is the complex of triphenylborane with sodium hydroxide.

4. A method according to claim 1 wherein said microorganisms are bacteria.

5. A method according to claim 1 wherein said microorganisms are algae.

6. A method according to claim 1 wherein said microorganisms are of the class Phycomycetes.

7. An agronomical process for the combatting of microorganisms of the class Thallophyta which comprises impregnating the soil with an effective amount not less than about 10 parts per million of a thallophyticide according to claim 1.

8. A method for the prevention and control of root rot in the leguminous plants which consists in treating the soil with a thallophyticide according to claim 1 and growing leguminous plants in said treated soil.

9. A method of inhibiting the growth of microorganisms of the division Thallophyta in cooling tower water which comprises treating said water with a thallophyticide according to claim 1.

10. A method according to claim 1 wherein said thallophyticide is a complex of tri-p-tolylborane with a Lewis base having a $pK_b$ less than about 10.

11. A method according to claim 1 wherein said thallophyticide is a complex of tri-p-xylylborane with a Lewis base having a $pK_b$ less than about 10.

12. A method according to claim 1 wherein said thallophyticide is a complex of tri-(p-fluorophenyl) borane with a Lewis base having a $pK_b$ less than about 10.

13. A method according to claim 1 wherein said thallophyticide is a complex of tri-(p-methoxyphenyl) borane with a Lewis base having a $pK_b$ less than about 10.

14. A method according to claim 1 wherein said thallophyticide is a complex of triphenetylborane with a Lewis base having a $pK_b$ less than about 10.

15. A method according to claim 1 wherein said thallophyticide is a complex of trinaphthylborane with a Lewis base having a $pK_b$ less than about 10.

16. A method according to claim 1 wherein said thallophyticide is a complex of triphenylborane with a Lewis base having a $pK_b$ less than about 10.

17. A method according to claim 16 wherein said microorganisms are bacteria.

18. A method according to claim 16 wherein said microoganisms are of the class Phycomycetes.

19. A method of inhibiting the growth of microorganisms of the classification Thallophyta, which comprises contacting the said microorganisms with triphenylborane in an amount effective to inhibit the growth of said microorganisms.

20. A method of inhibiting the growth of microorganisms of the classification Thallophyta, which comprises contacting the said microorganisms with trinaphthylborane in an amonut effective to inhibit the growth of said microorganisms.

21. A method of inhibiting the growth of microorganisms of the division Thallophyta which comprises contacting the said microorganisms with tri-p-tolyl borane in an amount effective to inhibit the growth of said microorganisms.

22. A method of inhibiting the growth of microorganisms of the division Thallophyta which comprises contacting the said microorganisms with tri-p-xylylborane in an amount effective to inhibit the growth of said microorganisms.

23. A method of inhibiting the growth of microorganisms of the division Thallophyta which comprises contacting the said microorganisms with tri-(p-fluorophenyl) borane in an amount effective to inhibit the growth of said microorganisms.

24. A method of inhibiting the growth of microorganisms of the division Thallophyta which comprises contacting the said microorganisms with tri-(p-methoxyphenyl) borane in an amount effective to inhibit the growth of said microorganisms.

25. A method of inhibiting the growth of microorganisms of the division Thallophyta which comprises contacting the said microorganisms with triphenetyl borane in an amount effective to inhibit the growth of said microorganisms.

26. A thallophyticidal composition comprising a thallophyticide selected from the class consisting of:

(1) triphenylborane,
   (2) alkyl-substituted triphenylboranes,
   (3) halogen-substituted triphenylboranes,
   (4) alkoxy-substituted triphenylboranes,
   (5) trinaphthylborane,
   (6) complexes of triphenylborane with Lewis bases having a $pK_b$ less than about 10,
   (7) complexes of alkyl-substituted triphenylboranes with Lewis bases having a $pK_b$ less than about 10,
   (8) complexes of halogen-substituted triphenylboranes with Lewis bases having a $pK_b$ less than about 10,
   (9) complexes of alkoxy-substituted triphenylboranes with Lewis bases having a $pK_b$ less than about 10 and
   (10) complexes of trinaphthylborane with Lewis bases having a $pK_b$ less than about 10, together with a surface active agent as a dispersant therefor.

27. A thallophyticidal composition according to claim 26 wherein said thallophyticide is a complex of triphenylborane with a Lewis base having a $pK_b$ less than about 10.

28. A thallophyticidal composition according to claim 26 wherein said thallophyticide is a complex of trinaphthylborane with a Lewis base having a $pK_b$ less than about 10.

29. A thallophyticidal composition according to claim 26 wherein said thallophyticide is the complex of triphenylborane with sodium hydroxide.

30. A thallophyticidal composition consisting essentially of an effective amount of from about 0.1 part per million to about 1 percent of triphenylborane in a compatible inert diluent together with a surface active agent as a dispersant therefor.

References Cited in the file of this patent

Berichte: 57B, page 813 (1924); 61B, page 271 (1928); 63B, page 924 (1930); 64B, page 2112 (1931).